(12) United States Patent
Hämmerle (10) Patent No.: US 8,882,210 B2
(45) Date of Patent: Nov. 11, 2014

(54) DRAWER SYSTEM

(75) Inventor: Hermann Hämmerle, Lustenau (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 13/561,312

(22) Filed: Jul. 30, 2012

(65) Prior Publication Data

US 2012/0306337 A1 Dec. 6, 2012

Related U.S. Application Data (63) Continuation of application No. PCT/AT2011/000061, filed on Feb. 3, 2011.

(30) Foreign Application Priority Data

Feb. 3, 2010 (AT) .................................. A 145/2010

(51) Int. Cl.
- A47B 88/00 (2006.01)
- G01G 19/02 (2006.01)
- A47B 88/04 (2006.01)
- G01G 21/10 (2006.01)
- G01G 23/01 (2006.01)

(52) U.S. Cl.
CPC .......... *G01G 19/024* (2013.01); *A47B 88/0422* (2013.01); *G01G 19/028* (2013.01); *G01G 21/10* (2013.01); *G01G 23/01* (2013.01)
USPC ..................................... 312/330.1; 312/348.4

(58) Field of Classification Search
USPC ........... 312/330.1, 333, 332.1, 334.6–334.27, 312/348.1, 348.4
See application file for complete search history.

(56) References Cited

U.S. PATENT DOCUMENTS

| | | | | |
|---|---|---|---|---|
| 1,960,365 A | * | 5/1934 | Barker | 312/400 |
| 5,015,047 A | * | 5/1991 | Nock | 312/334.11 |
| 5,281,021 A | | 1/1994 | Rock et al. | |
| 5,496,105 A | * | 3/1996 | Czarnecky et al. | 312/334.4 |

(Continued)

FOREIGN PATENT DOCUMENTS

| | | |
|---|---|---|
| CN | 1718135 | 1/2006 |
| DE | 20 2005 005 489 | 6/2005 |

(Continued)

OTHER PUBLICATIONS

International Search Report issued May 23, 2011 in International (PCT) Application No. PCT/AT2011/000061.

(Continued)

*Primary Examiner* — Darnell Jayne
*Assistant Examiner* — Timothy M Ayres
(74) *Attorney, Agent, or Firm* — Wenderoth, Lind & Ponack, L.L.P.

(57) ABSTRACT

An arrangement includes a drawer and a pull-out guide for the drawer. The drawer has a drawer container and a front panel that can be connected to the container, and the drawer can be detachably fastened to the pull-out guide by a fastening device. The pull-out guide has at least one first and one second locking position for fastening the drawer, and the drawer can be provided with a first type of front panel or a second type of front panel. The particular drawer can be locked or fastened in the first or second locking position depending on the front panel type.

18 Claims, 11 Drawing Sheets

(56) References Cited

U.S. PATENT DOCUMENTS

| | | | |
|---|---|---|---|
| 5,580,139 A * | 12/1996 | Grabher | 312/333 |
| 6,036,291 A * | 3/2000 | Rock | 312/333 |
| 7,695,080 B2 * | 4/2010 | Chen et al. | 312/333 |
| 8,052,234 B2 * | 11/2011 | Liang et al. | 312/334.4 |
| 8,056,994 B2 * | 11/2011 | Chen et al. | 312/334.6 |
| 2004/0227440 A1 | 11/2004 | Booker et al. | |
| 2006/0005502 A1 | 1/2006 | Bodingbauer | |
| 2008/0111455 A1* | 5/2008 | Fitz | 312/319.5 |
| 2008/0231156 A1* | 9/2008 | Hoshide et al. | 312/334.46 |
| 2008/0303397 A1* | 12/2008 | Chen et al. | 312/334.46 |

FOREIGN PATENT DOCUMENTS

| | | |
|---|---|---|
| DE | 20 2005 018 788 | 4/2007 |
| EP | 0 421 458 | 4/1991 |
| EP | 1 483 984 | 12/2004 |
| WO | 2007/062961 | 6/2007 |
| WO | 2009/149479 | 12/2009 |

OTHER PUBLICATIONS

Austrian Patent Office Search Report completed Jun. 26, 2010 in Austrian Patent Application No. A 145/2010.

English translation of Chinese Search Report (SR) issued Sep. 4, 2013 in corresponding Chinese Patent Application No. 201180007157.1.

* cited by examiner

DRAWER SYSTEM

This application is a Continuation of International Application No. PCT/AT2011/000061, filed Feb. 3, 2011, the entire disclosure of which is incorporated herein by reference.

BACKGROUND OF THE INVENTION

The invention concerns an arrangement comprising a drawer and an extension guide for the drawer. The drawer has a drawer container and a front panel connectable to the drawer container, the drawer can be releasably fixed to the extension guide by a fixing device, and the extension guide has at least a first and a second latching position for fixing the drawer. The invention further concerns an article of furniture comprising a furniture carcass, at least two extension guides fixed in mutually superposed relationship to the furniture carcass, and at least a first and a second drawer latchable to the respective extension guides by a fixing device. The at least two drawers respectively have a drawer container and a front panel connectable to the container. Arrangements of this kind are disclosed for example in DE 20 2005 018 788 U1 or in DE 20 2005 005 489 U1.

To assemble articles of furniture, the manufacturers of the articles of furniture or fitments supply generally standardized components which can then be relatively quickly and easily assembled by the fitter on site. Thus, in most cases, uniform extension guides for drawers are made available, which are fitted to the furniture carcass. A pre-drilled drilling pattern is generally already provided on the furniture carcass to permit positioning of the extension guide to correspond to drawers which are to be later fitted. In that respect, in the state of the art it is always necessary to take account of the kind of drawer which is later to be fitted to the extension guide. In other words, when a front pull-out arrangement is used, in which the front panel butts against the furniture carcass in the closed position, the extension guide must be fitted to the furniture carcass at a further forward position. Otherwise, when fitting the drawer to the pre-mounted extension guide, a problem would arise that an extension guide which is disposed completely in the closed position could no longer be reached at all by the drawer together with the front panel as the front panel already butts against the furniture carcass before reaching the fixing position of the drawer on the extension guide. It is only if the fitter of the extension guides precisely knows beforehand what kind the drawers to be fitted are, that he can suitably position the extension guides further forwardly or rearwardly.

Thus an object of the invention is to be able to position extension guides on the furniture carcass in uniform fashion irrespective of knowledge about the drawers which can be later fitted.

A further problem arises in particular if the arrangement of the drawers is to be subsequently altered. More specifically then the individual drawers no longer match together with the positions of the extension guides, and the extension guides would have to be subsequently removed and re-fitted at a suitable location.

A further object of the invention is therefore that of permitting simple and matched fitment of drawers in extension guides. In particular, the invention seeks to provide that the individual drawers can be fitted to the extension guides independently of the fixing positions of the guides. The invention seeks to provide that there is no need for subsequent and complicated re-fitting of extension guides.

SUMMARY OF THE INVENTION

According to the present invention, the above objects are achieved by the features of the invention as described below.

Accordingly, it is provided that the first and/or second latching position is established automatically in dependence on an abutment which can be removed or moved and which can be arranged on the drawer, and the position of the abutment is established in dependence on the type of the front panel of the drawer, that is connected to the drawer container.

In particular, the dependency of the latching position on the type of front panel means that it is possible even subsequently for an internal pull-out arrangement—in which the front panel does not butt against (abut) the furniture carcass and thus extends further into the article of furniture—to be exchanged for a drawer with a front pull-out arrangement.

It is preferably provided that the removable abutment is arranged on the front panel. That abutment is thus arranged on the front panel itself according to a front panel type, whereby so-to-speak the latching position is controlled by the front panel.

It can quite particularly preferably be provided that the front panel has a pre-mounted connecting element, by way of which the front panel is connectable to the drawer container, and the removable abutment is arranged on the connecting element. Thus, the drawer without a front panel can be easily fixed to the extension guide in a first latching position. When then the front panel is fitted, in the case of a front panel type in the form of an internal pull-out arrangement, the latching position is released and the drawer can then be pushed into a further rearwardly disposed second latching position.

Accordingly, it can particularly preferably be provided that upon fixing of the drawer to the extension guide, the removable abutment butts directly against a limiting extension of the extension guide and latches the drawer in the first latching position of the extension guide. In other words, when fitting the drawer, the abutment butts against the extension guide so that the drawer latches in a first latching position.

Alternatively, it can also be provided that a transmission device is arranged at the floor of the drawer container, preferably at a container rail, and has a displacement element as an indirectly actuable abutment with the limiting extension which is movable from a first position into a second position by contact with the abutment of the front panel. The displacement element butts against the limiting extension of the extension guide only in the first position upon fixing of the drawer. If now the displacement element is moved into the second position upon fitting of the front panel to the drawer container, the displacement element no longer butts against the limiting extension and the entire drawer can be further moved into the article of furniture. The displacement element can also be mounted movably to the side wall of the drawer, wherein it is moved into the first or second position in dependence on the front panel which is inserted into the side wall. For example, in dependence on a front panel which is inserted into a side wall of the drawer, an abutment can move out, preferably downwardly, and accordingly 'enforce' drawer positioning further forwardly.

As soon as the front panel is removed or interchanged, the abutment moves back into the interior of the side wall again and the drawer can be positioned again entirely rearwardly on the extension guide and fixed in position there.

In other words, there are basically two variants for establishing the abutment. The first variant is the configuration with an indirectly movable abutment which can be reciprocated by way of a displacement element between two different positions in dependence on the front panel. The second variant provides that an abutment arranged on the front panel directly establishes the latching position. Accordingly, the first and/or second latching position is established automatically in dependence on a movable or removable abutment which can be arranged on the drawer. In the case of the first variant, the abutment is movable between two positions. In the case of the second variant, sometimes a direct abutment is present and sometimes it is absent (that is to say removed).

By virtue of the fact that the position of the abutment is established in dependence on the type of drawer front panel connected to the drawer container, both variants enjoy the advantage that the depth of the position of the drawer on the extension guide is adapted to or is dependent on the front panel. In this respect, it should be pointed out that the first and second latching positions are arranged in mutually displaced relationship in relation to the depth of the article of furniture. In other words, the latching positions form mutually different depths in terms of the drawer being pushed on the extension guide.

The extension guide can also have a drawer rail connectable to the drawer and a carcass rail for fitting the extension guide to a furniture carcass, the limiting extension of the extension guide being arranged on the drawer rail. In a further preferred variant, the drawer can have a container rail, wherein the fixing device releasably holds the container rail to the drawer rail of the extension guide. That container rail is preferably arranged at the floor of the drawer.

In that respect, according to the invention, the drawer can be provided with a first type of front panel or a second type of front panel, and the respective drawer can be latched or fixed in the first or second latching position in dependence on the type of front panel. In that way, the latching depths do not have to be established for example by hand or there is no need for manual release of a latching position for the drawer on the extension guide, but merely fitting the front panel to the rest of the drawer container directly determines the latching position of the drawer.

Preferably, respect that a drawer having a first front panel type can be latchable in the first latching position and a drawer having a second front panel type can be latchable in the second latching position. Only one of the two front panel types may have a direct or indirect abutment. In principle, the front panels do not have to have any mechanical abutment at all for altering the latching position. Rather, it can also be provided that arranged on the drawer or on the extension guide, for example, is a special electronic sensor means which recognizes or detects the kind of front panel fitted to the drawer container. The latching position can then be mechanically established or altered in dependence on the detected type of front panel.

For an article of furniture, the first drawer can have a front panel type for a front pull-out arrangement in the form of an increased-height front panel which covers over the second drawer provided with a front panel type for an internal pull-out arrangement. The container of the second drawer is latched at the first, further inwardly disposed, latching position of the one extension guide, and the container of the first drawer is latched at the second, further forwardly disposed, latching position of the other extension guide. In that respect cover over means that, viewed from the front, only the front panel of the front pull-out arrangement is to be seen while the front panels of the internal pull-out arrangements are concealed therebehind, so-to-speak internally.

In particular, the extension guides fixed to the furniture carcass in mutually superposed relationship can be fixed to the furniture carcass in the same vertical position. In that respect, the same vertical position means that the extension guides (more especially the carcass rail thereof) are arranged one above the other in non-displaced relationship on the furniture carcass. In other words, this means that the individual extension guides or their carcass rails are arranged at the same horizontal spacing from the rear wall of the article of furniture or the front side of the furniture carcass thereof, in which case they do not have to be mounted to the furniture carcass in displaced relationship in accordance with drawers which can be later fitted.

BRIEF DESCRIPTION OF THE DRAWINGS

Further details and advantages of the present invention are described more fully hereinafter by means of the specific description with reference to the embodiments by way of example illustrated in the drawings, in which.

DETAILED DESCRIPTION OF THE INVENTION

Figure 1:
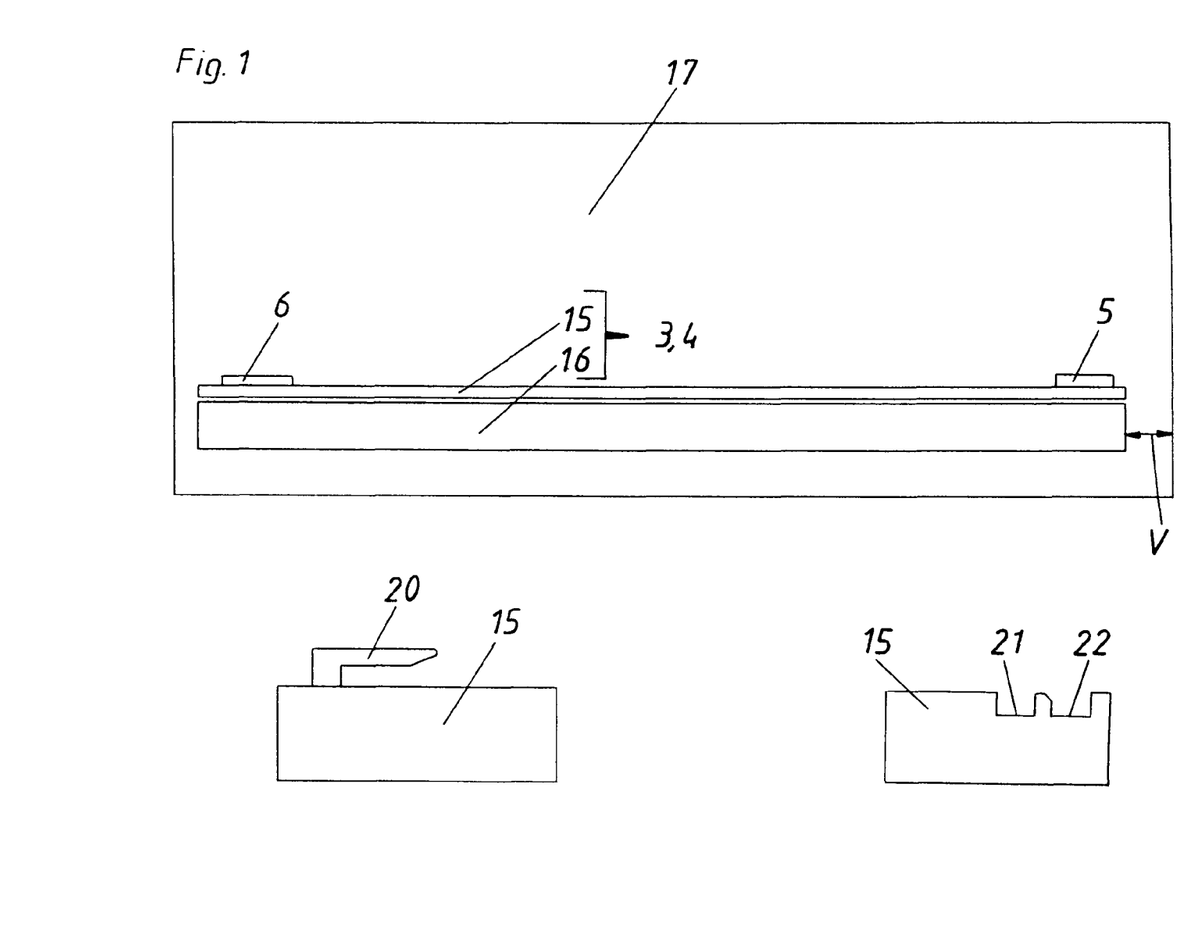
FIG. 1 shows a diagrammatic view of an extension guide with the fixing regions.

FIG. 1 diagrammatically shows how an extension guide 3 or 4 is fixed to a furniture carcass 17. In this respect, the carcass rail 16 is mounted to the furniture carcass 17 while the drawer rail 15 is displaceably mounted on the carcass rail 16. The drawer rail 15 has at least parts of the fixing devices 5 and 6. In this respect, the fixing device 6 comprises on the one hand the holding nose 20 which is fixed to the drawer rail 15 and a guide element 23 (see FIG. 2) which is arranged on the drawer 1 and 2, respectively. When a drawer 1 and 2, respectively, is fitted to the extension guide 3 and 4, respectively, the guide element 23 moves in between the holding nose 20 and the drawer rail 15 so that a vertical movement is prevented by the positively locking connection between the parts 15, 23 and 20. The fixing device 5 is provided in the front region of the drawer rail 15. The fixing device 5 is in the form of two latching recesses 21 and 22 into which a latching nose 24 on the drawer 1 or 2 can latch. After latching engagement of the latching nose 24, a positively locking connection is formed between the latching recesses 21 and 22 and the latching nose 24 in the direction of opening of the drawer, which positively locking connection can be released by lifting the drawer. Thus, by simply pushing the drawer 1 or 2 to fit it on the drawer rail 15 by means of the fixing devices 5 and 6, the drawer 1 or 2 can be fixed in a positively locking relationship to the extension guide 3 or 4, respectively, and that engagement can be released again by lifting the drawer 1 or 2 and pulling it out.

Figure 2:
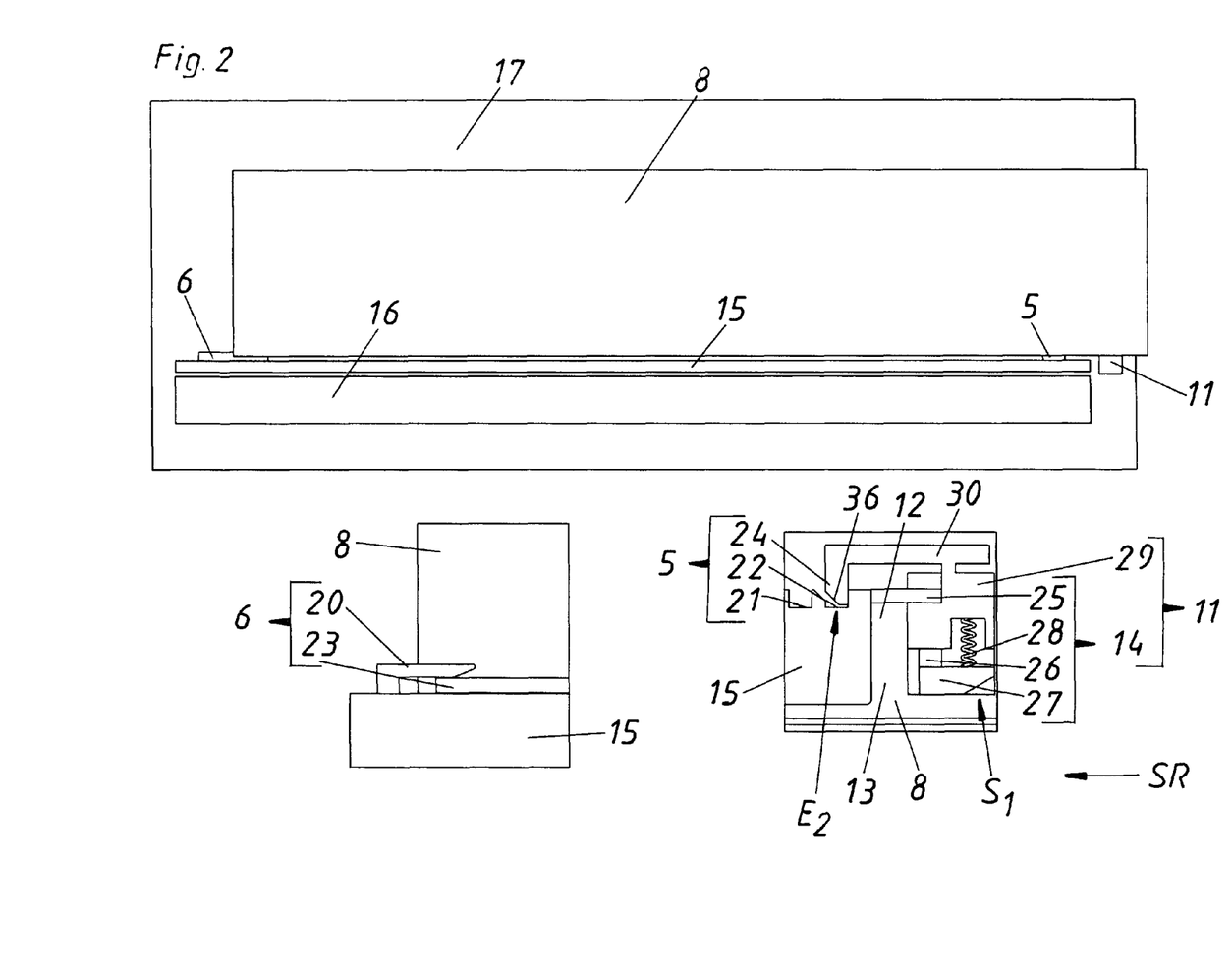
FIG. 2 shows a diagrammatic view of an extension guide with fitted drawer container and detail portions of the fixing regions.

As shown in FIG. 2 in the bottom right illustration therein, a transmission device 11 is arranged on the floor 13 of the drawer container 8. In the illustrated first position $S_1$, the transmission device 11 serves to limit the movement of the drawer container 8 relative to the drawer rail 15 by the transmission device abutment 25, by butting against (abutting) the limiting extension 12. As the actuating element 27 is not actuated in that position $S_1$, the entire displacement element 14 (consisting of actuating element 27, spring 28, connecting portion 26, and transmission device abutment 25) remains in the position $S_1$ with respect to the base portion 29 of the transmission device 11. As can be seen from this view, the latching nose 24 is preferably integrally connected to the base portion 29 of the transmission device 11 by a preferably slightly resilient connecting portion 30. The drawer container 8 passes into the position shown in FIG. 2 by movement of the drawer container 8 in the closing direction SR. In that case, the inclined region 36 of the latching nose 24 slides along the drawer rail 15 with bending of the connecting portion 30 in the region of the limiting extension 12, in which case the latching nose 24 latches into the latching position $E_2$ upon reaching the latching recess 22.

Figure 3:
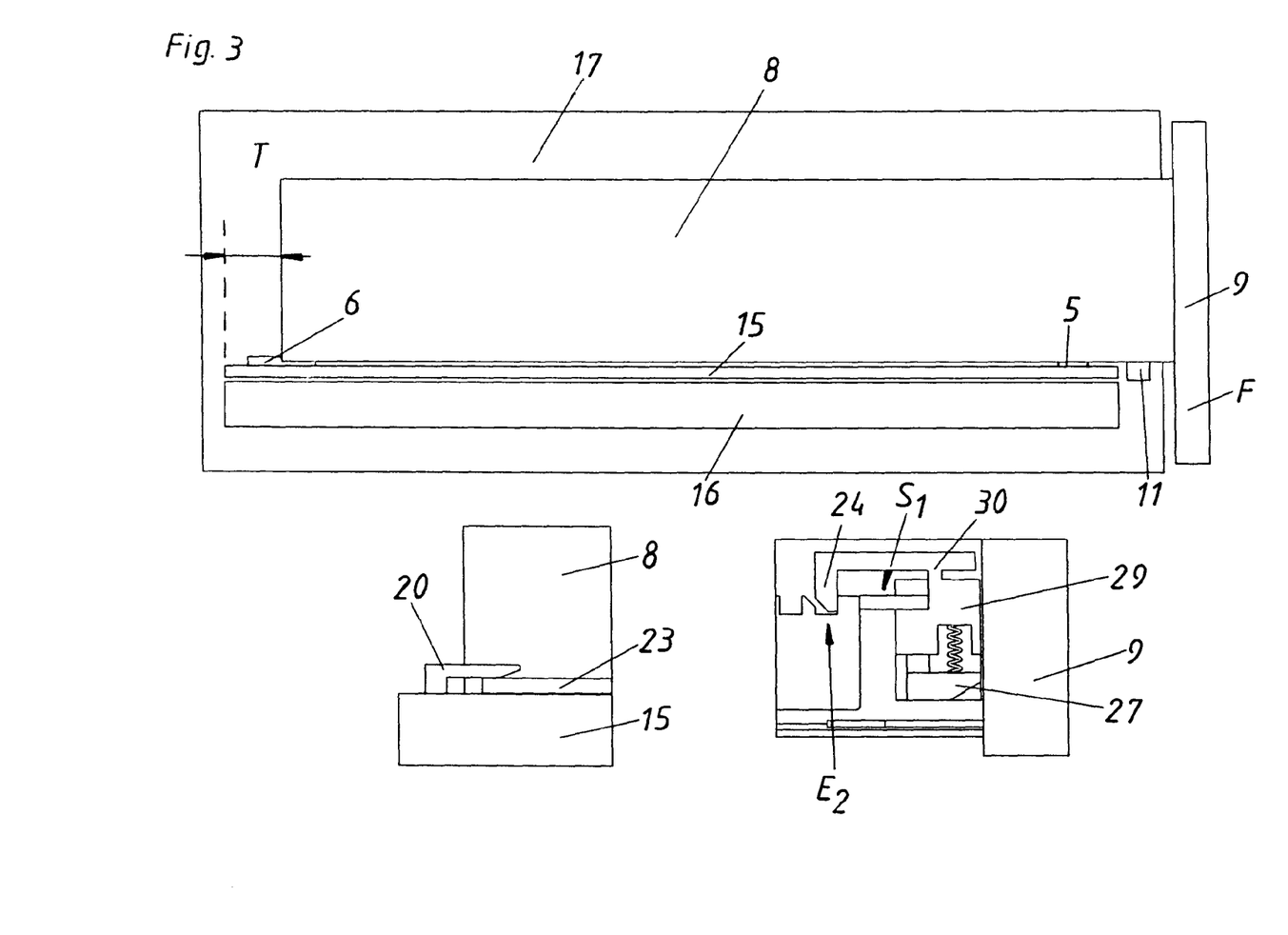
FIG. 3 shows a diagrammatic view of the extension guide with drawer container with front panel and detail portions of the fixing regions.

As then shown in FIG. 3, therefore, this gives a slightly opened depthwise position T of the drawer container 8 on the extension guide 3 or 4, whereby a front panel 9 of a front pull-out arrangement F can be fitted without any problem to the drawer container 8 which is still sufficiently opened. Thus, in this closed position $S_1$ of the transmission device 11 or the latching position $E_2$ of the latching nose 24, it is possible to fit any desired front panel 9 to the drawer container 8.

Figure 4:
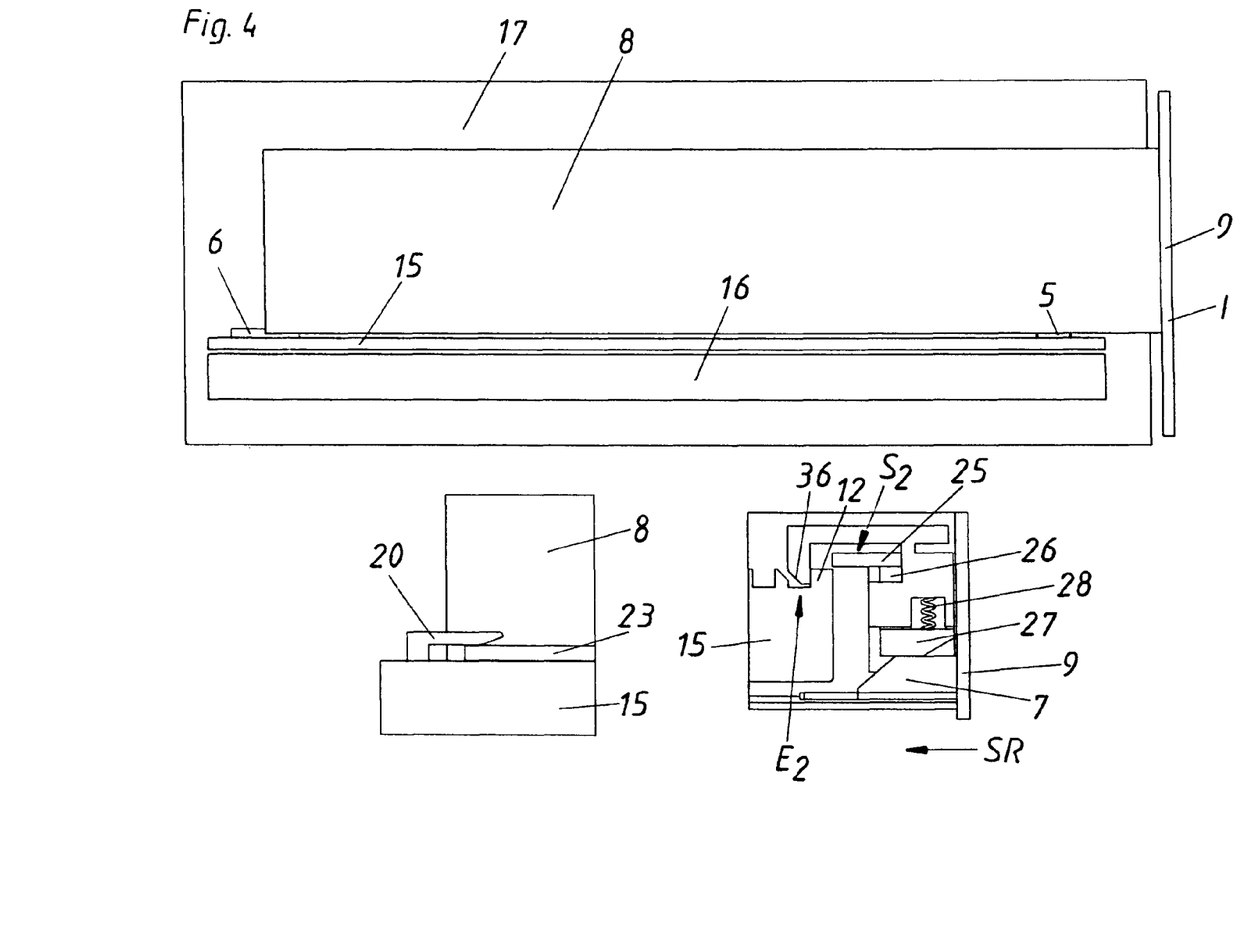
FIG. 4 shows a diagrammatic view of the extension guide with drawer container with front panel in the form of an internal pull-out arrangement and detail portions of the fixing regions.

If now a front panel 9 for an internal pull-out arrangement I—as shown in FIG. 4—is fitted to the drawer container 8 as shown in FIG. 2, a further inward movement of the entire drawer 1 or 2 in the closing direction SR is desired. In order now to release the transmission device abutment 25, an abutment 7 is arranged for that purpose on the front panel 9 of the internal pull-out arrangement I. After sliding movement along corresponding inclined surfaces, the abutment 7 moves the actuating element 27 from the position $S_1$ into the position $S_2$ against the spring force of the spring 28 whereby, as a further consequence, the connecting portion 26 and the transmission device abutment 25 of the displacement element 14 are moved away from the limiting extension 12 of the drawer rail 15 so that movement of the drawer container 8 in the closing direction SR with respect to the drawer rail 15 is possible.

Figure 5:
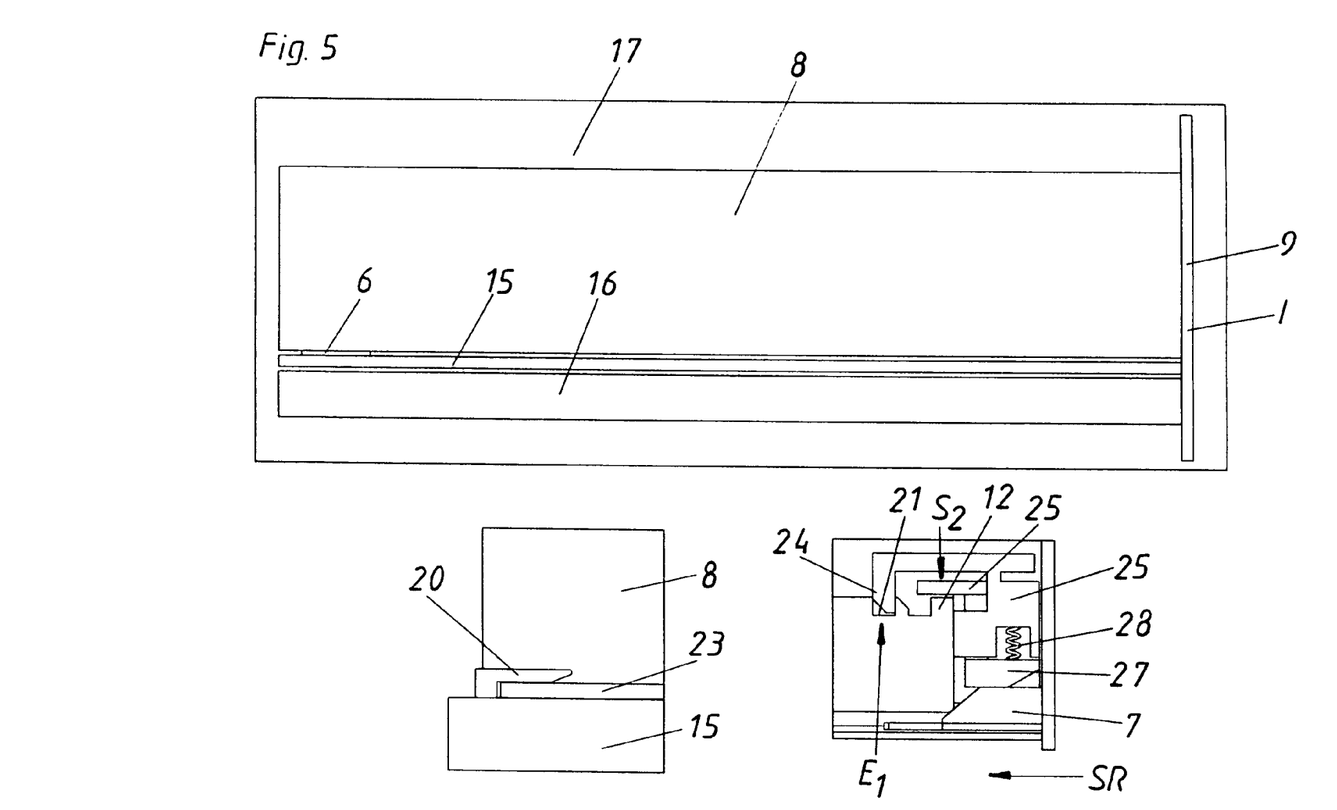
FIG. 5 shows the drawer with internal pull-out arrangement in the completely closed position.

Upon such a movement in the closing direction SR (direction of fitting on the front panel 9), the inclined surface 36 of the latching nose 24 slides along the inclined surface between the latching recesses 21 and 22 from the first latching position $E_2$ into the second latching position $E_1$. Thus, the transmission device 11 is configured to change a latching position of the fixing device 5, 6 (from $E_2$ to $E_1$) upon receiving a force from the abutment 7 of the front panel. In that position (see FIG. 5) therefore the drawer container 8, in relation to the drawer rail 15, is in the completely closed position in which the guide element 23 also cannot be moved with respect to the holding nose 20 or can scarcely be moved any further in relation thereto.

Figure 6:
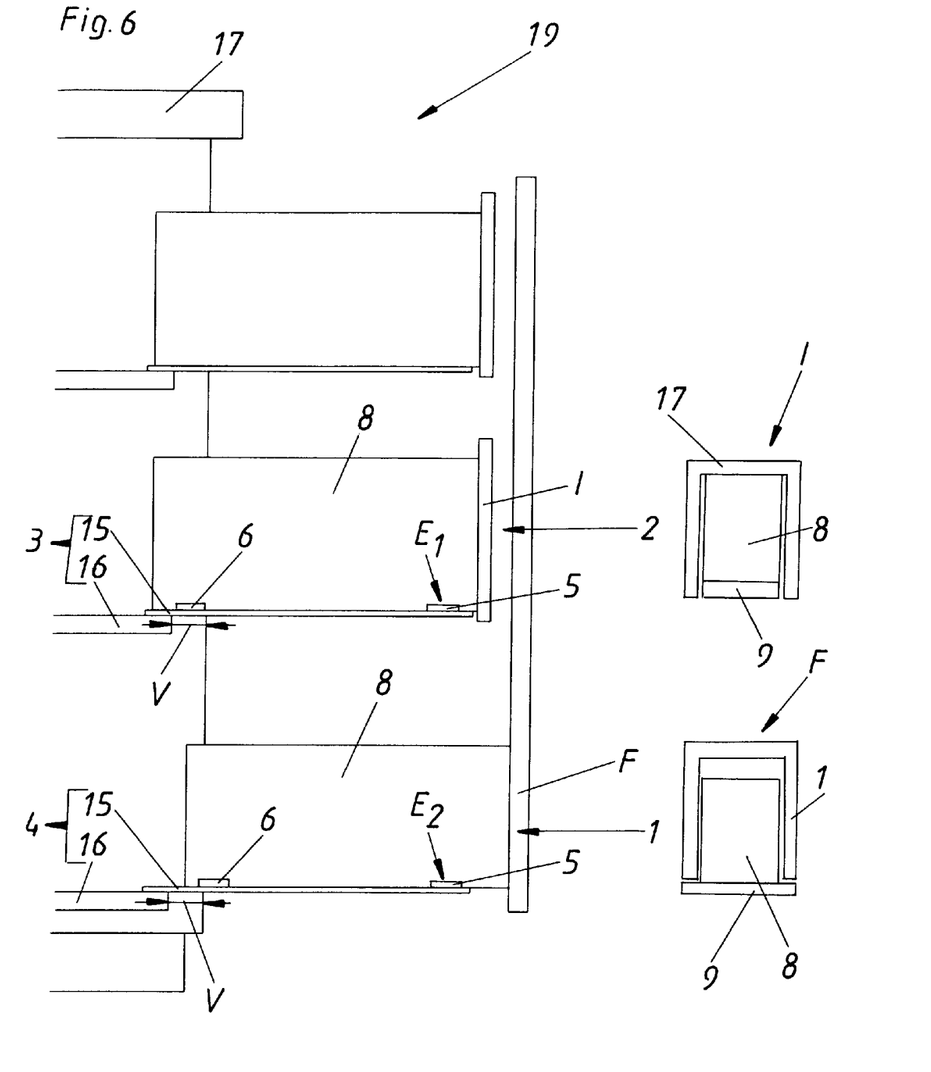
FIG. 6 shows a diagrammatic view of an article of furniture with different drawer variants.

As can be seen from FIG. 6, the carcass rail 16 of the extension guide 3 and the extension guide 4 is fitted in the same vertical position V on the furniture carcass 17 of the article of furniture 19. In spite of that non-displaced arrangement of the extension guides 3 and 4, drawers 1 and 2 with different extension arrangement types (internal pull-out arrangement I, front pull-out arrangement F) can be fitted in place without any fear of a collision between the front panels 9 of the individual drawers 1 and 2 respectively in the completely open or the completely closed position. Due to the different latching positions $E_1$ and $E_2$, the drawer 2 with the front panel 9 of the internal pull-out arrangement I in the fully extended condition cannot at all knock against the front panel F of the drawer 1. By virtue of the fixing of the individual drawers 1 and 2, interchange of the individual drawers 1 and 2 is possible without any problem. By virtue of interchange of the individual front panels 9, the standardized drawer containers 8 can change from their previously assumed latching position $E_1$ and $E_2$ respectively.

Figure 7:
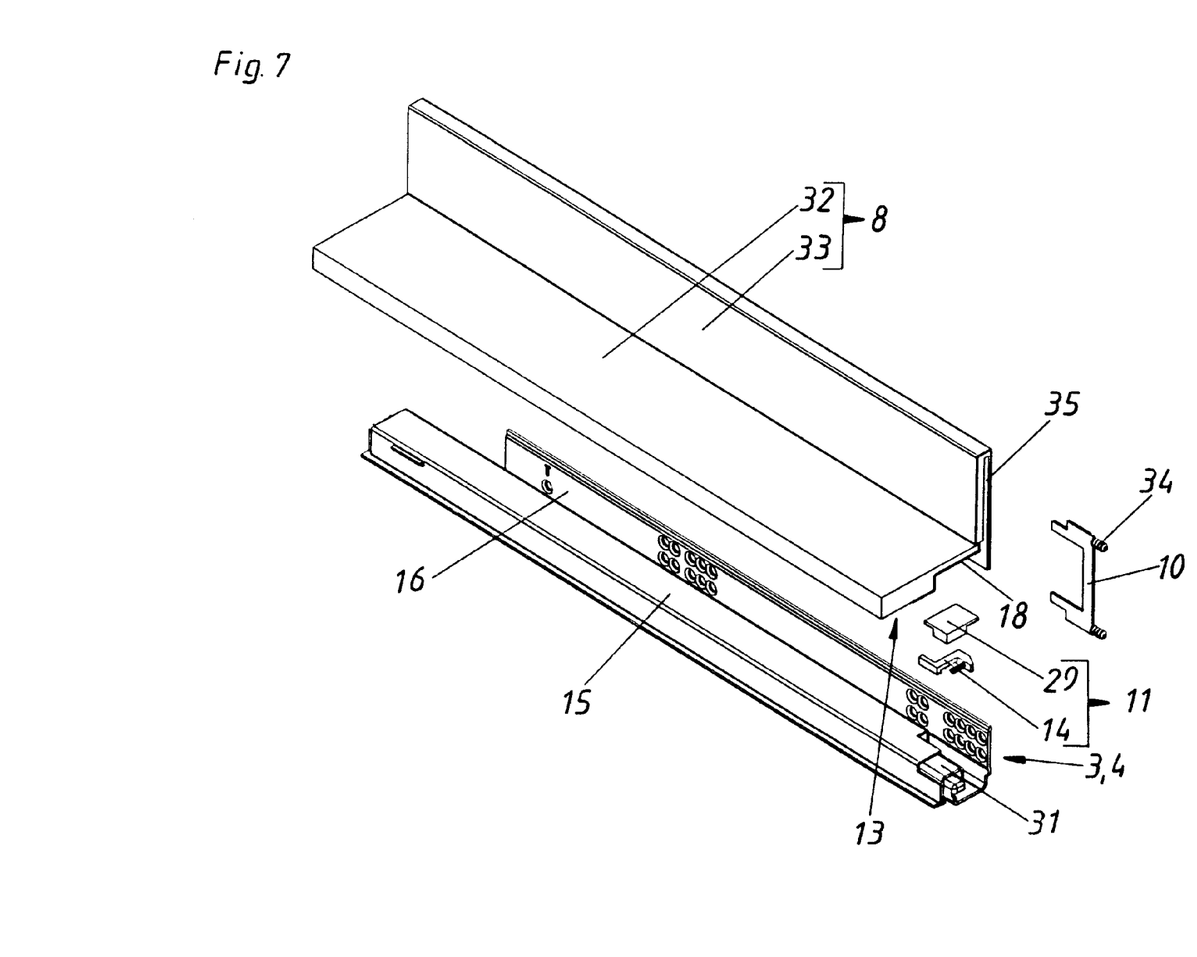
FIG. 7 shows an exploded view of a drawer container with transmission device and extension guide.

FIG. 7 shows an extension guide 3 or 4, respectively, which substantially comprises the drawer rail 15, the carcass rail 16, and a central rail 31 arranged therebetween. The drawer 1 or 2 which is only partly shown here substantially comprises the drawer frame structure 33 and the drawer bottom 32. Provided in the side wall or drawer frame structure 33 is a receiving element 35 for receiving the connecting element 10. The base portion 29 of the transmission device 11 can be fixed to the floor 13 of the drawer container 8 in the region of a container rail 18. The connecting element 10 can be connected to a front panel 9 (not shown here) by way of fixing extensions 34 (for example pegs).

Figure 8:
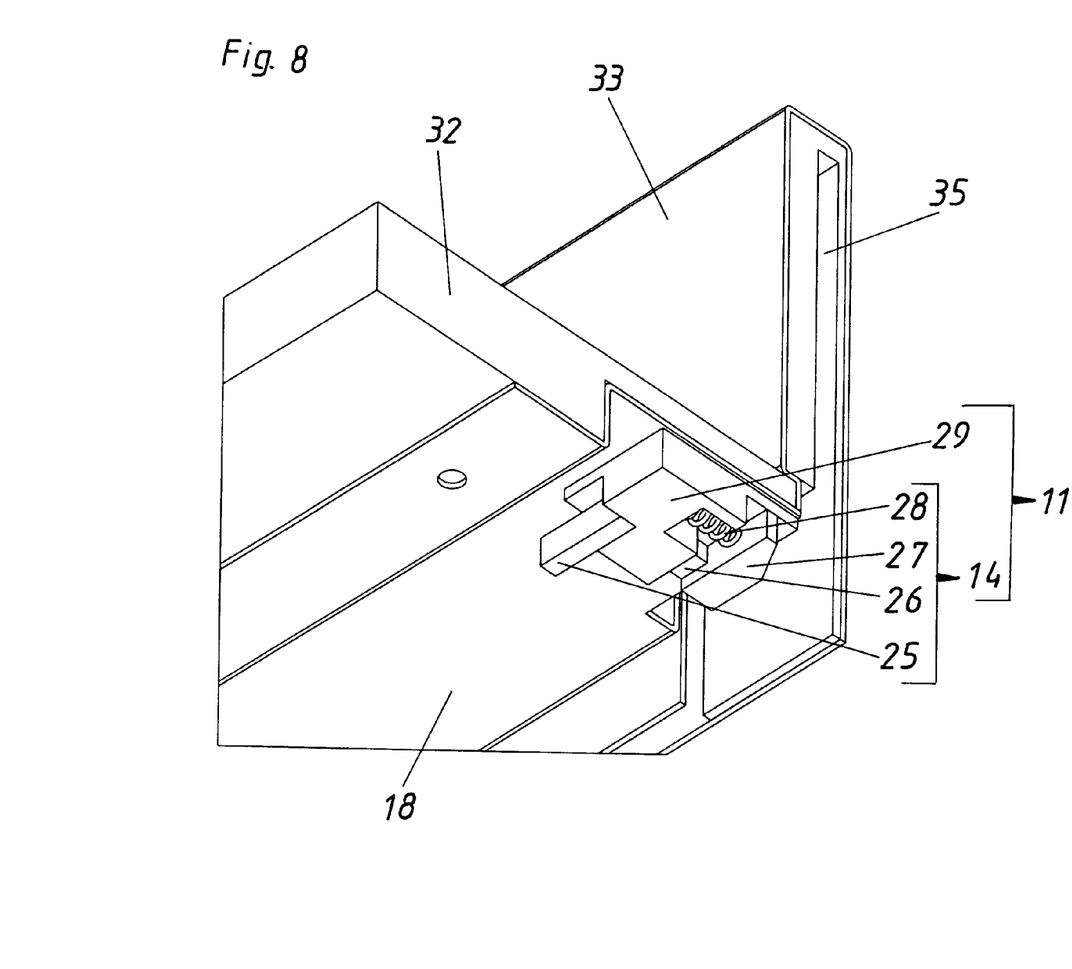
FIG. 8 shows a view from below of a transmission arrangement mounted to the floor of a drawer.

FIG. 8 is a view from below showing the transmission element 11 arranged on the container rail 18. In this case, the displacement element 14 is arranged movably from the closed position $S_1$ into the closed position $S_2$ in the base portion 29 of the transmission element 11.

Figure 9:
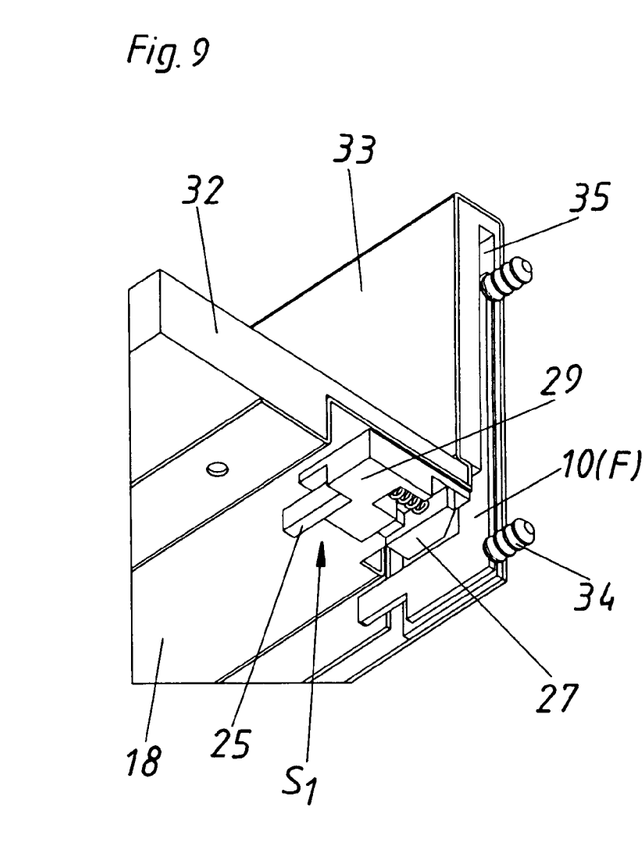
FIG. 9 shows the transmission device in the unactuated closed position.

In FIG. 9, the connecting element 10 of a front pull-out arrangement F is introduced into the receiving element of the drawer container 8, in which case the actuating element 27 is not actuated so that the transmission device abutment 25 remains in the position $S_1$.

Figure 10:
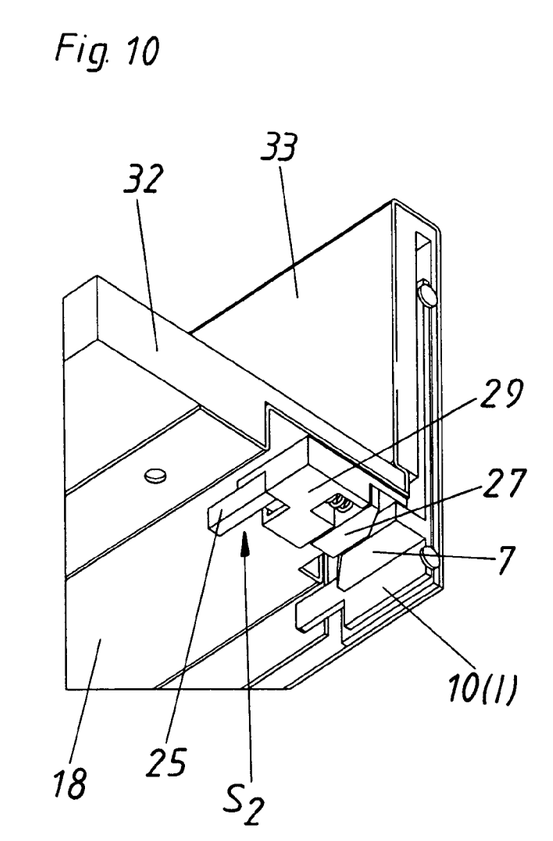
FIG. 10 shows a view from below of a transmission device in the actuated closed position.
Figure 11:
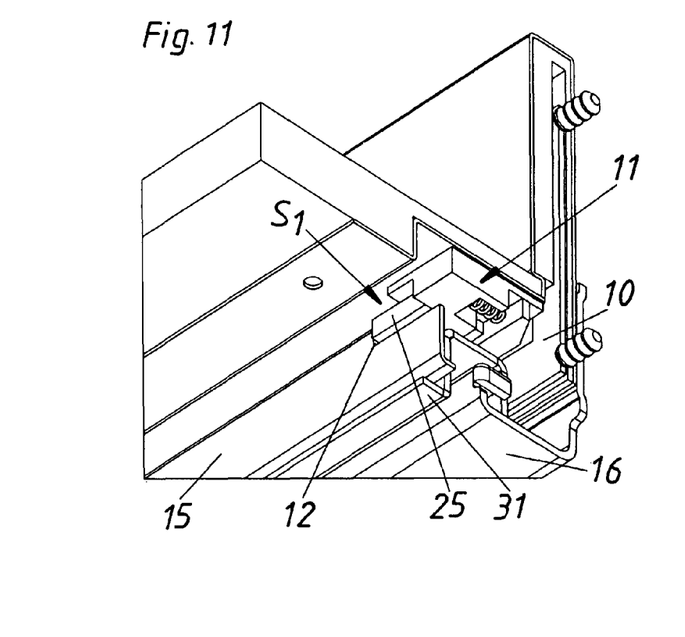
FIG. 11 shows a view from below of FIG. 9 with extension guide.
Figure 12:
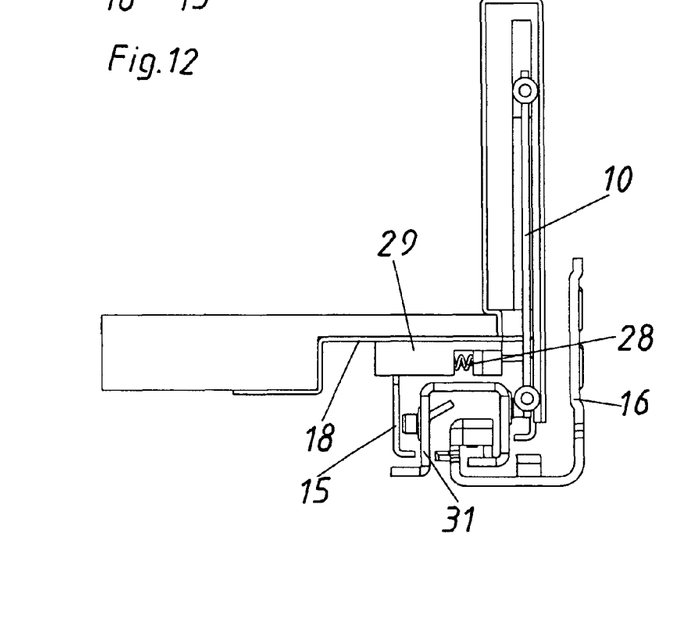
FIG. 12 shows a section through FIG. 11.
Figure 13:
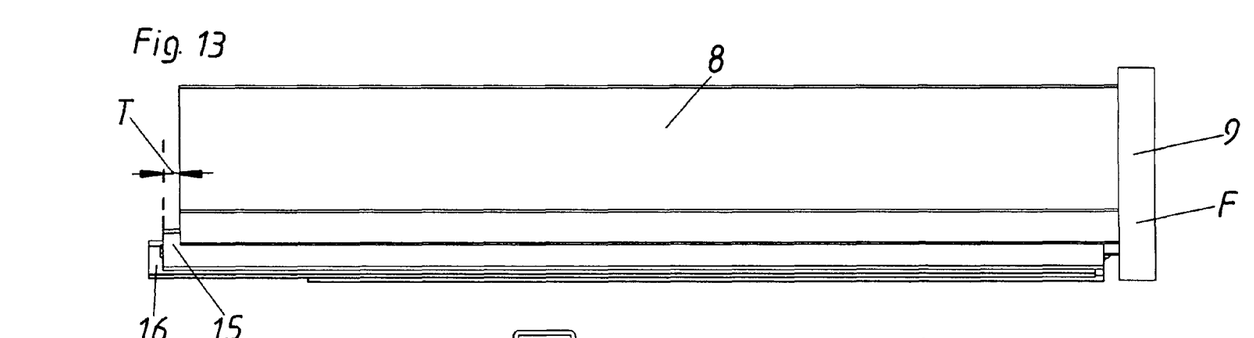
FIG. 13 shows a side view of a drawer with front pull-out arrangement.
Figure 14:
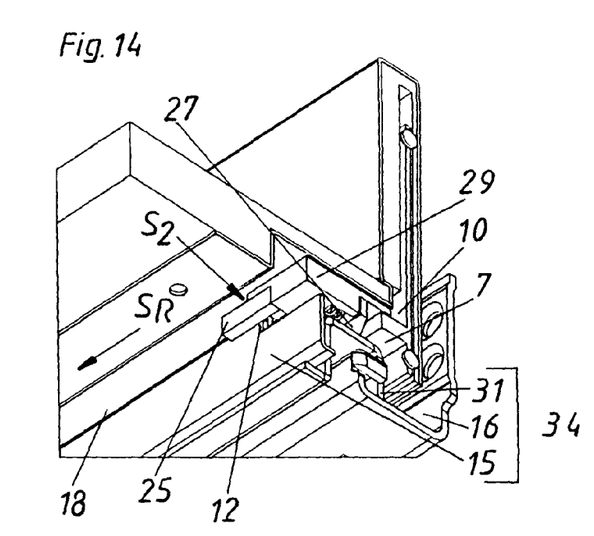
FIG. 14 shows a view from below of FIG. 10 with extension guide.
Figure 15:
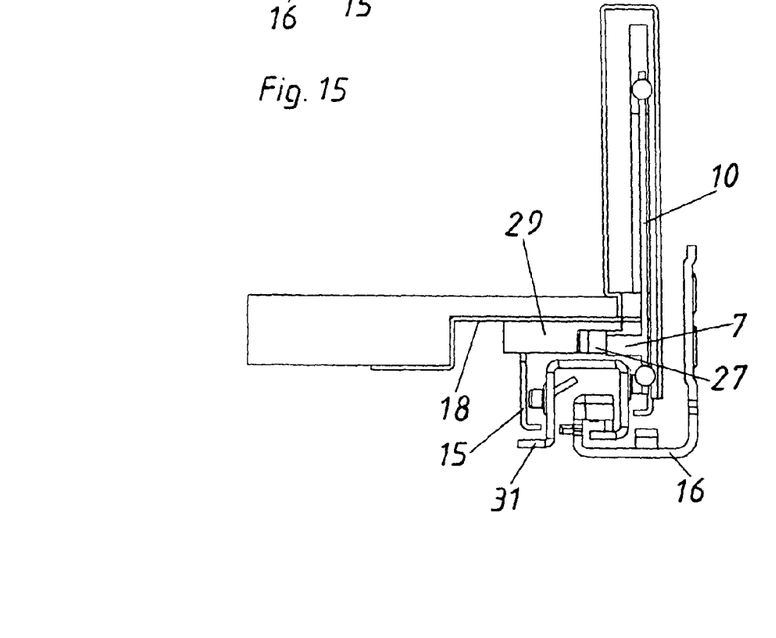
FIG. 15 shows a section through FIG. 14.
Figure 16:
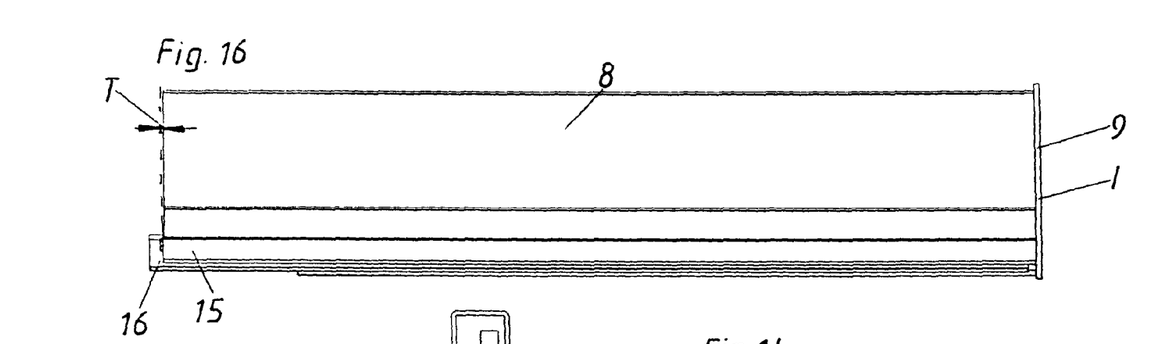
FIG. 16 shows a side view of a drawer with internal pull-out arrangement.

In comparison, in FIG. 10, the connecting element 10 of an internal pull-out arrangement I with abutment 7 is introduced, whereby the displacement element 14 passes into the position $S_2$. As can be seen corresponding thereto in FIG. 14 in that position $S_2$, the transmission device abutment 25 no longer butts against the limiting extension 12 of the drawer rail 15 so that movement of the drawer container 8 in the closing direction SR with respect to the drawer rail 15 is made possible. Displacement is effected by the abutment 7 which is preferably in one piece (a one-piece construction) with the connecting element 10. In comparison, in FIG. 11, the displacement element 14 is shown in position $S_1$ in which the transmission device abutment 25 butts against (abuts) the limiting extension 12 of the drawer rail 15.

Thus, the present invention shows an arrangement or an article of furniture 19 in which a drawer 1, 2 can be fitted to an extension guide 3, 4 in a not entirely closed intermediate position as a lock member 25 (transmission device abutment) prevents the drawer 1 or 2 from being fitted 'entirely rearwardly' on the drawer rail 15 and thus the drawer 1 or 2, upon being fitted for the first time (without front panel 9), can be fitted to the drawer rail 15 of the extension guide 3 or 4 only in the front end position (first latching position) $E_2$. It is only with fitment of the front panel 9 that a decision is made as to whether the lock member (abutment) 25 is released so that the drawer 1 or 2 can move in relation to the drawer rail 15 into the completely closed position (second latching position $E_1$). Thus, the type of front panel F or I controls the latching position $E_1$ or $E_2$ for the drawer 1 or 2 on the extension guide 3 or 4 respectively.

In summary, it is possible with the invention described herein for a drawer in the form of an internal pull-out arrangement or a front pull-out arrangement to be latched at a differing depth on the extension guide, in particular the drawer rail thereof. Provided for that purpose on the drawer is a so-called tab-stop which is provided directly on the front panel or in the form of an abutment actuable by the front panel. The abutment acts as a positioning aid for the drawer in latching positions at differing depths on the extension guide. In that respect, the latching position is dependent on the positioning abutment of the drawer which in turn is dependent on the nature of the front panel. More especially the positioning abutment can either be provided directly on the front panel or it can be displaceable in its position indirectly by the front panel.

The invention claimed is:

1. A drawer arrangement comprising:
   a drawer having a container and a front panel to be connected to said container, said front panel having an abutment directly thereon;
   an extension guide for supporting said drawer;
   a fixing device for releasably fixing said drawer to said extension guide at a first latching position and a second latching position, alternatively, said first latching position and said second latching position being spaced apart along a longitudinal axis of said extension guide; and
   a transmission device for changing a latching position of said fixing device from the first latching position to the second latching position upon receiving a force from said abutment;
   wherein said drawer, said extension guide, said fixing device, and said transmission device are configured such that said drawer is automatically releasably fixed to said extension guide at the second latching position due to engagement of said abutment with said transmission device.

2. The drawer arrangement of claim 1, wherein, upon fixing said drawer to said extension guide, said abutment abuts directly against a limiting extension of said extension guide and latches said drawer in the first latching position.

3. The drawer arrangement of claim 2, wherein said extension guide includes a drawer rail releasably fixed to said drawer, and a carcass rail for attaching said extension guide to a furniture carcass, wherein said limiting extension of said extension guide is on said drawer rail.

4. The drawer arrangement of claim 3, wherein said drawer includes a container rail, said fixing device being configured to releasably hold said container rail to said drawer rail of said extension guide.

5. The drawer arrangement of claim 1, wherein said transmission device includes a displacement element, said displacement element having an indirectly actuable and movable abutment for abutting against a limiting extension of said extension guide, said abutment of said displacement element being movable from a first position into a second position by contact of said abutment of said front panel with said displacement element.

6. The drawer arrangement of claim 5, wherein said transmission device is located at a container rail at a floor of said container of said drawer.

7. The drawer arrangement of claim 5, wherein said displacement element is configured so that said abutment of said displacement element abuts against said limiting extension of said extension guide only in the first position.

8. A drawer arrangement kit comprising:
   a drawer having a container;
   a first front panel connectable to said container;
   a second front panel connectable to said container, said second front panel having an abutment directly thereon and having a different configuration than said first front panel;
   an extension guide for supporting said drawer;
   a fixing device for releasably fixing said drawer to said extension guide at a first latching position and a second latching position, alternatively, said first latching position and said second latching position being spaced apart along a longitudinal axis of said extension guide; and
   a transmission device for changing a latching position of said fixing device from the first latching position to the second latching position upon receiving a force from said abutment;
   wherein said drawer, said extension guide, said fixing device, said transmission device, said first front panel, and said second front panel are configured such that said drawer is releasably fixed to said extension guide at the first latching position when said first front panel is connected to said container of said drawer, and such that said drawer is automatically moved and fixed to said extension guide at the second latching position due to engagement of said abutment of said second front panel with said transmission device when said second front panel is connected to said container of said drawer.

9. The drawer arrangement kit of claim 8, wherein said extension guide includes a drawer rail releasably fixed to said drawer, and a carcass rail for attaching said extension guide to a furniture carcass, wherein said limiting extension of said extension guide is on said drawer rail.

10. The drawer arrangement kit of claim 9, wherein said drawer includes a container rail, said fixing device being configured to releasably hold said container rail to said drawer rail of said extension guide.

11. The drawer arrangement kit of claim 8, wherein said transmission device includes a displacement element, said displacement element having an indirectly actuable and movable abutment for abutting against a limiting extension of said extension guide, said abutment of said displacement element being movable from a first position into a second position by contact of said abutment of said second front panel with said displacement element.

12. The drawer arrangement kit of claim 11, wherein said displacement element is configured so that said abutment of said displacement element abuts against said limiting extension of said extension guide only in the first position.

13. A drawer arrangement comprising:
   a drawer having a container and a front panel to be connected to said container, said front panel having a connecting element for connecting said front panel to said container, an abutment being located on said connecting element;
   an extension guide for supporting said drawer;
   a fixing device for releasably fixing said drawer to said extension guide at a first latching position and a second latching position, alternatively, said first latching position and said second latching position being spaced apart along a longitudinal axis of said extension guide; and a transmission device for changing a latching position of said fixing device from the first latching position to the second latching position upon receiving a force from said abutment;

wherein said drawer, said extension guide, said fixing device, and said transmission device are configured such that said drawer is automatically releasably fixed to said extension guide at the second latching position due to engagement of said abutment with said transmission device.

14. The drawer arrangement of claim 13, wherein said transmission device includes a displacement element, said displacement element having an indirectly actuable and movable abutment for abutting against a limiting extension of said extension guide, said abutment of said displacement element being movable from a first position into a second position by contact of said abutment of said front panel with said displacement element.

15. The drawer arrangement of claim 14, wherein said displacement element is configured so that said abutment of said displacement element abuts against said limiting extension of said extension guide only in the first position.

16. A drawer arrangement kit comprising:
a drawer having a container;
a first front panel connectable to said container, said first front panel having a connecting element for connecting said front panel to said container;
a second front panel connectable to said container, said second front panel having a connecting element for connecting said front panel to said container, an abutment being located on said connecting element of said second front panel;
an extension guide for supporting said drawer;
a fixing device for releasably fixing said drawer to said extension guide at a first latching position and a second latching position, alternatively, said first latching position and said second latching position being spaced apart along a longitudinal axis of said extension guide; and
a transmission device for changing a latching position of said fixing device from the first latching position to the second latching position upon receiving a force from said abutment;

wherein said drawer, said extension guide, said fixing device, said transmission device, said first front panel, and said second front panel are configured such that said drawer is releasably fixed to said extension guide at the first latching position when said first front panel is connected to said container of said drawer, and such that said drawer is automatically moved and fixed to said extension guide at the second latching position due engagement of said abutment of said second front panel with said transmission device when said second front panel is connected to said container of said drawer.

17. The drawer arrangement kit of claim 16, wherein said transmission device includes a displacement element, said displacement element having an indirectly actuable and movable abutment for abutting against a limiting extension of said extension guide, said abutment of said displacement element being movable from a first position into a second position by contact of said abutment of said second front panel with said displacement element.

18. The drawer arrangement kit of claim 17, wherein said displacement element is configured so that said abutment of said displacement element abuts against said limiting extension of said extension guide only in the first position.

* * * * *